United States Patent
Wang et al.

(10) Patent No.: US 10,796,410 B2
(45) Date of Patent: Oct. 6, 2020

(54) PANORAMIC IMAGE MAPPING METHOD

(71) Applicant: PEKING UNIVERSITY SHENZHEN GRADUATE SCHOOL, Shenzhen (CN)

(72) Inventors: Ronggang Wang, Shenzhen (CN); Yueming Wang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 80 days.

(21) Appl. No.: 16/313,731

(22) PCT Filed: Dec. 13, 2016

(86) PCT No.: PCT/CN2016/109603
§ 371 (c)(1),
(2) Date: Dec. 27, 2018

(87) PCT Pub. No.: WO2018/010371
PCT Pub. Date: Jan. 18, 2018

(65) Prior Publication Data
US 2020/0175648 A1    Jun. 4, 2020

(30) Foreign Application Priority Data

Jul. 12, 2016    (CN) .......................... 2016 1 0543056

(51) Int. Cl.
*G06K 9/36* (2006.01)
*G06T 3/40* (2006.01)

(52) U.S. Cl.
CPC .......... *G06T 3/4007* (2013.01); *G06T 3/4038* (2013.01)

(58) Field of Classification Search
None
See application file for complete search history.

(56) References Cited

U.S. PATENT DOCUMENTS

| 6,239,808 B1 | 5/2001 | Kirk et al. |
| 6,282,490 B1 * | 8/2001 | Nimura ................ G01C 21/367 340/990 |

(Continued)

FOREIGN PATENT DOCUMENTS

| CN | 101777193 A | 7/2010 |
| CN | 102346923 A | 2/2012 |

(Continued)

OTHER PUBLICATIONS

Yao, Xiaohui, et al. "A new environment mapping method using equirectangular panorama from unordered images." 2011 International Conference on Optical Instruments and Technology: Optoelectronic Measurement Technology and Systems. vol. 8201 . International Society for Optics and Photonics, 2011. (Year: 2011).*

(Continued)

*Primary Examiner* — Sean M Conner
(74) *Attorney, Agent, or Firm* — Miles & Stockbridge P.C.

(57) ABSTRACT

Disclosed is a panoramic image mapping method, wherein mapping regions and a non-mapping region are partitioned for an equirectangular panoramic image with a resolution of 2M×M, where only the partitioned mapping regions are mapped as square regions; the method comprises:, computing a vertical distance and a horizontal distance from a point on the square region to a center of the square region, a larger one of which being denoted as m; computing a distance n from the point to a zeroth ($0^{th}$) point on a concentric square region; computing a longitude and a latitude corresponding to the point; computing a corresponding position (X, Y) in the equirectangular panoramic image to which the point is (Continued)

mapped; and then assigning a value to the point. The method may effectively reduce oversampling, thereby effectively reducing the number of pixels of the panoramic image and the code rate required for coding with little distortion.

9 Claims, 5 Drawing Sheets

(56) References Cited

U.S. PATENT DOCUMENTS

2017/0301132 A1* 10/2017 Dalton .................... G06T 7/521
2018/0007389 A1* 1/2018 Izumi ................... H04N 19/167

FOREIGN PATENT DOCUMENTS

| CN | 104835117 A | 8/2015 |
| CN | 106127691 A | 11/2016 |

OTHER PUBLICATIONS

Wang, Yueming, et al. "Polar square projection for panoramic video." 2017 IEEE Visual Communications and Image Processing (VCIP). IEEE, 2017. (Year: 2017).*

* cited by examiner

PANORAMIC IMAGE MAPPING METHOD

CROSS-REFERENCE TO RELATED APPLICATIONS

The present application is a national stage filing under 35 U.S.C. § 371 of PCT/CN2016/109603, filed on Dec. 13, 2016 which claims priority to CN Application No. 201610543056.0, filed on Jul. 12, 2016. The applications are incorporated herein by reference in their entirety.

FIELD

Embodiments of the present disclosure generally relate to the field of virtual reality, and more specifically relate to a novel panoramic image mapping technology, which may be applied to an equirectangular panoramic image to reduce a code rate required for coding the equirectangular panoramic image.

BACKGROUND

Constant development of virtual reality (VR) technologies boosts the increasing demands on VR videos. Compared with a traditional planar image, a 360° panoramic image requires a wider angle of view (AOV) and thus a higher resolution, and accordingly a higher code rate as required for coding.

Currently, a most common mapping manner is equirectangular mapping. However, this mapping manner has an issue of serious oversampling in high-latitude regions. Panoramic image mapping manners have been improved in the academia and industry, e.g., by mapping an equirectangular panoramic image to some new planes to reduce oversampling in the high-latitude regions. Although the new mapping manners would reduce code rates to a certain extent, interpolation during a mapping procedure brings about some distortion problems.

SUMMARY

To overcome the drawbacks in the prior art, the present disclosure provides a novel panoramic image mapping method that may be applied to an equirectangular panoramic image, which effectively ameliorates a distortion problem during a mapping process and reduces a code rate required for coding the panoramic image, thereby improving an oversampling problem in equirectangular mapping.

The mapping method provided according to the present disclosure may reduce 25% of the number of pixels in a preferred setting, and during a testing sequence, reduce 11% of the code rate (more code rate will be reduced for a panoramic image of a high-latitude area that has more details), and substantially has no distortion.

A technical solution of the present disclosure is provided below:

a panoramic image mapping method, wherein mapping regions and a non-mapping region are partitioned for an equirectangular panoramic image with a resolution of 2M×M, where only the partitioned mapping regions are mapped to square regions to reduce oversampling, thereby achieving an object of effectively reducing the number of pixels of the panorama image and a code rate required for coding with little distortion; the method comprises:

Step 1: for a point with a coordinate (x, y) on a square region, computing a vertical distance and a horizontal distance from the point to a central point of the square region, a larger one thereof being denoted as m;

Step 2: for the point with the coordinate (x, y) on the square region, computing a distance from the point to a zeroth ($0^{th}$) point on a concentric square region, denoted as n; the $0^{th}$ point being a point at an arbitrary position;

Step 3: computing, based on the n and a longitude and a latitude corresponding to the point with the coordinate (x, y) on the square region; and Step 4: computing, based on the longitude and latitude obtained in step 3, a position (X, Y) in the equirectangular panoramic image to which the point with the coordinate (x, y) on the square region is mapped:

$$X = \frac{180° + \text{longitude}}{360°} \times 2M \quad \text{(equation 8)}$$

$$Y = \left(\frac{90° - \text{latitude}}{180°}\right) \times M \quad \text{(equation 9)}$$

Step 5: in the case that the (X, Y) is an integer pixel, assigning a pixel value at the equirectangular panoramic image (X, Y) to the point (x, y) on the square region; and in the case that the (X, Y) is not an integer pixel, taking a pixel value of the point (x, y) on the square region derived from interpolating a pixel near (X, Y).

For the panoramic image mapping method, further, a high-latitude 2M×H region of the panoramic image is set as a mapping region, wherein the mapping region is provided into two: the H is set as a height of the mapping region. H≤M/2 Preferably, the H is 0.25M.

For the panoramic image mapping method, further, a high-latitude range of the panoramic image set as the mapping region is preferably from ±45° to ±90°.

For the panoramic image mapping method, further, in the step of computing a distance from the point to the $0^{th}$ point on the concentric square range, a pixel at a right upper corner is specifically selected as the $0^{th}$ pixel, which is obtained through processes below:

$$n_{up} = y - m' \quad \text{(equation 2)}$$

$$n_{right} = s + x - m' \quad \text{(equation 3)}$$

$$n_{down} = 2 \times s + (1024 - 1 - y - m') \quad \text{(equation 4)}$$

$$n_{left} = 3 \times s + (1024 - 1 - x - m') \quad \text{(equation 5)}$$

where $n_{up}$, $n_{right}$, $n_{down}$, $n_{left}$ denote distances from points at an upper side, a right side, a lower side, and a left side of the concentric square region to the 0th point, respectively; s=2×m, ¼ of the number of pixels on the square;

$$m' = \left(\frac{1024 - 1}{2} - m\right);$$

and m denotes a larger one of the vertical distance and the horizontal distance from the point with the coordinate (x, y) on the square region to the central point of the square region in step 1.

For the panoramic image mapping method, further, in step 3, based on the n and m, the longitude and the latitude corresponding to the point with the coordinate (x, y) on the square region are calculated through equations below:

$$\text{longitude} = \frac{n}{4s} \times 360° - 180° \quad \text{(equation 6)}$$

$$\text{latitude} = \pm 90° - \frac{[m]}{N/2} \times \frac{H}{M/2} \times \pm 90° \quad \text{(equation 7)}$$

where 4s denotes the number of pixels of the concentric square where the point is located; the value of longitude ranges from −180° to 180°, denoting from longitude 180° W to longitude 180° E; the value of latitude ranges from $$\pm \frac{M}{M/2} \times 90° \text{ to } \pm 90°,$$

where the positive value represents north latitude and the negative value represents south latitude.

For the panoramic image mapping method, further, an interpolating method in step 5 refers to a bicubic interpolation, a bilinear interpolation, or a nearest-neighbor interpolation. The interpolating method is preferably the bicubic interpolation.

Compared with the prior art, the present disclosure has the following beneficial effects:

the novel panoramic image mapping method provided by the present disclosure may be applied to an equirectangular panoramic image, which effectively ameliorates a distortion problem during a mapping process and reduces a code rate required for coding the panoramic image, thereby improving an oversampling problem in equirectangular mapping. Generally, more code rate will be reduced for a panoramic image of a high-latitude region that has more details substantially without occurrence of distortion.

The present disclosure has the following advantages:

(1) reducing an oversampling phenomenon existing in a region with a relatively high latitude and reducing the number of pixels of the image so as to reduce the code rate required for coding the image, e.g., 25% of the number of pixels may be reduced by mapping two equirectangular 2M×0.5M regions of relatively high altitudes with a resolution of 2M×M to two $$\frac{M}{2} \times \frac{M}{2}$$

square regions, and 11% of code rate may be saved in average on the testing sequence.

(2) causing very little distortion during the mapping process.

BRIEF DESCRIPTION OF THE DRAWINGS

where (a) denotes a schematic diagram of computing a vertical distance and a horizontal distance from a point with the coordinate (x, y) to a center of the square region, $$\text{abs}\left(\frac{1024-1}{2} - x\right), \text{abs}\left(\frac{1024-1}{2} - y\right)$$

in the diagram denote the vertical distance and the horizontal distance from the point to the center, respectively; (b) denotes a schematic diagram of computing a distance from the point with the coordinate (x, y) to the $0^{th}$ point on the concentric square (the position of the 0th point may be arbitrarily selected; here, we select the point in the upper left 45° direction as the $0^{th}$ point)

where (a) denotes a panoramic image obtained using the equirectangular mapping method; and (b) denotes a panoramic image obtained from mapping according to the method provided by the present disclosure.

DETAILED DESCRIPTION OF EMBODIMENTS

Hereinafter, the present disclosure is further described through the embodiments, but the scope of the present disclosure is not limited in any manner.

The novel panoramic image mapping method provided by the present disclosure may be applied to an equirectangular panoramic image, which effectively ameliorates a distortion problem during a mapping process and reduces a code rate required for coding the panoramic image, thereby improving an oversampling problem in equirectangular mapping According to the mapping method provided by the present disclosure, a region with a relatively low latitude in the equirectangular mapping panoramic image is not mapped; instead, only a region with a relatively high latitude in the image is mapped to two square regions, which effectively reduces oversampling in the high-latitude region, and effectively reduces the number of pixels of the panoramic image and the code rate required for coding while has relatively little distortion. The method provided according to the present disclosure may reduce 25% of the number of pixels and during a testing sequence, reduce 11% of the code rate (more code rate will be reduced for a panoramic image of a high-latitude area that has more details), substantially without distortion.

For an equirectangular panoramic image with a resolution of 2M×M, its region of a relatively low latitude will not be mapped, and only the regions of a relatively high-latitude which have a serious oversampling phenomenon are mapped, where the regions of a relatively high latitude in the equirectangular panoramic image are mapped to two N×N square regions (a range for the region of a relatively low latitude and a range for the regions of a relatively high latitude may be customized. In experiments, it is found that a better effect is achieved if the 2M×0.5M region between ±45° mapped, while only two 2M×0.25M regions between ±45° and ±90° are mapped into two 0.5M×0.5M square regions). Two 2M×H (where H is a height of a customized region of a relatively high latitude, H≤M/2) regions of high latitude in the equirectangular panoramic image with a resolution of 2M×M are mapped to two N×N square regions.

Figure 1:
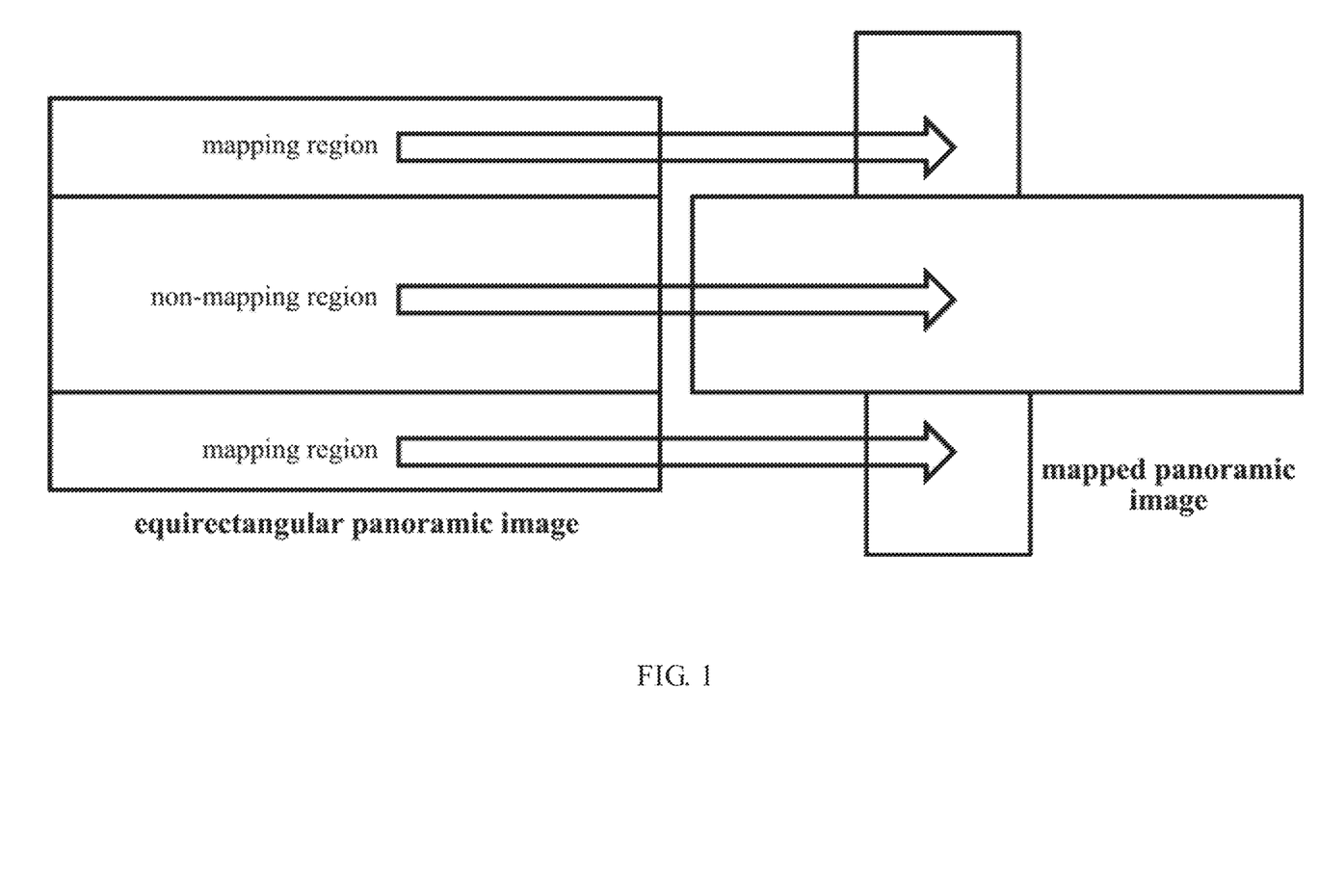
FIG. 1 is a schematic diagram of a mapping relationship in an embodiment of the present disclosure.

A specific implementation process of the present disclosure will be described through an embodiment below. FIG. 1 shows relationships in a mapping process of the present disclosure, where a low-latitude region of the equirectangular panoramic image is not mapped, while the high-latitude regions are mapped to squares. The low-latitude region of the equirectangular panoramic image with a resolution of 4096×2048 may reserved (in this embodiment, the low-latitude 4096×1024 region is reserved in this embodiment), and the upper and lower high-latitude 4096×512 regions are mapped to two 1024×1024 squares, such that after the mapping, the number of pixels is reduced by 25%.

Figure 2:
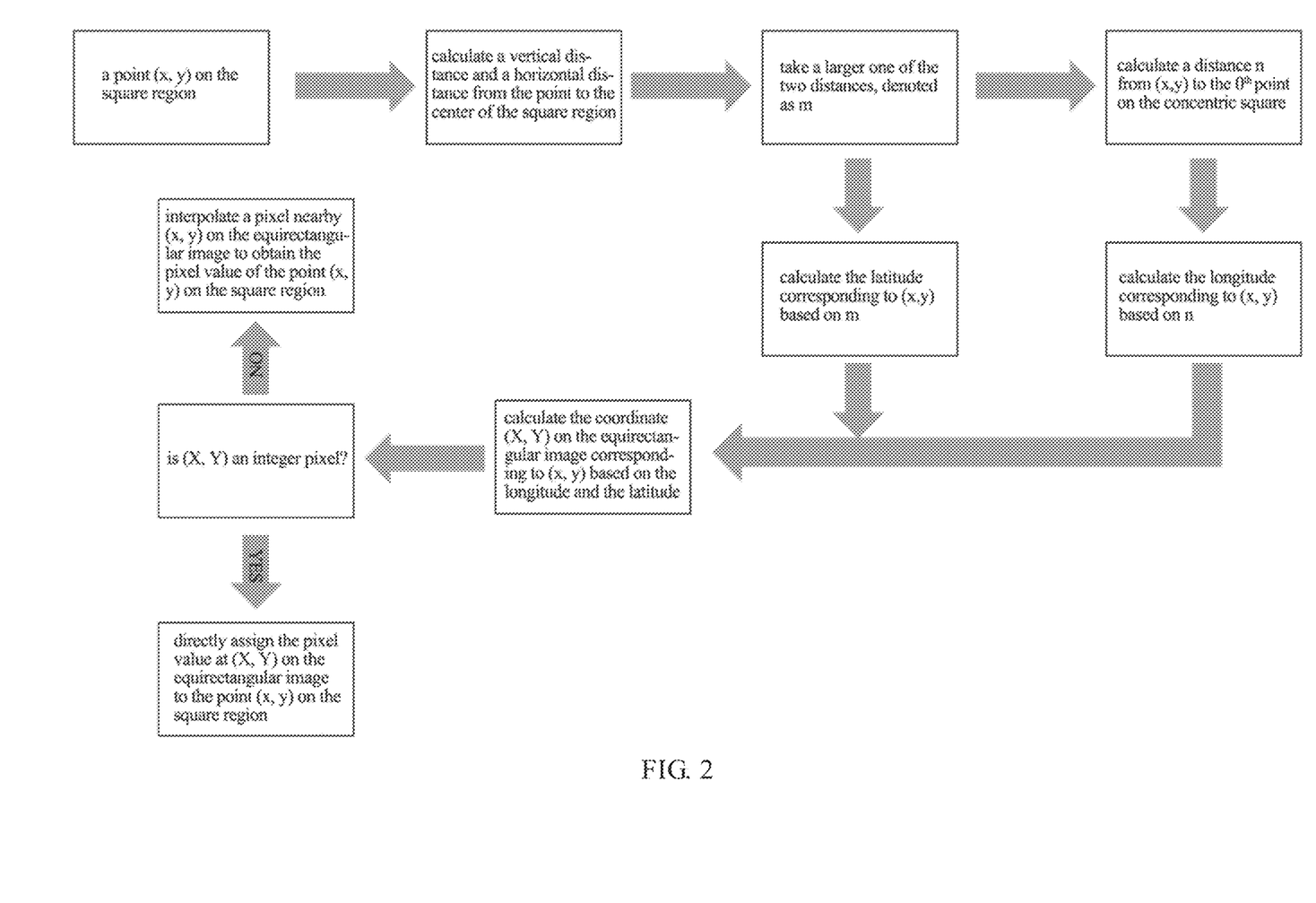
FIG. 2 is a block diagram of a flow of a panoramic image mapping method provided according to the present disclosure.
Figure 3:
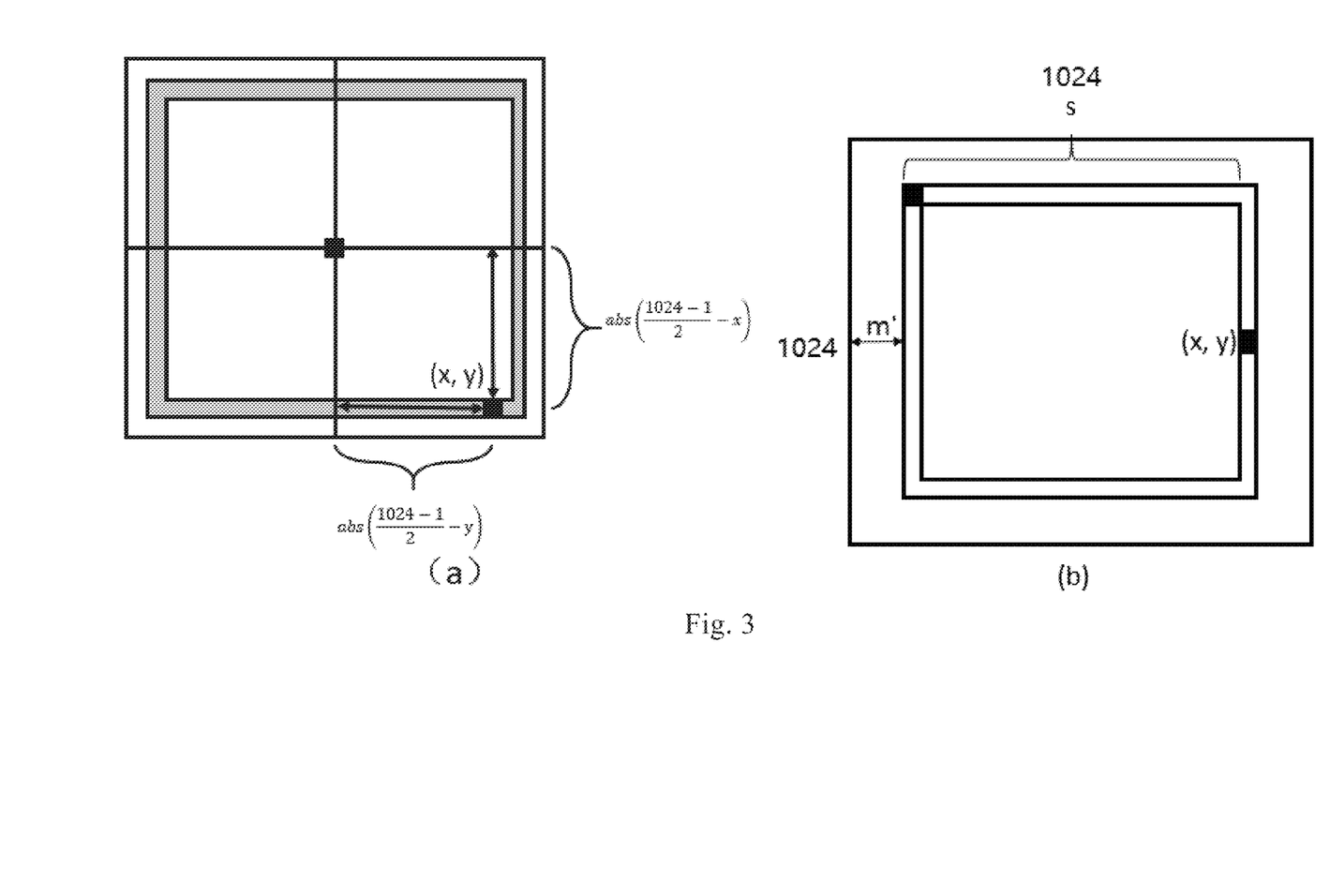
FIG. 3 is a schematic diagram of a specific computation process of the mapping method in an embodiment of the present disclosure.

FIG. 2 is a block diagram of a flow of a panoramic image mapping method provided according to the present disclosure. High-latitude region mapping is specifically computed below (in the computer, a lower-case initial value is usually 0, such that a −1 operation is carried out in some equations):

Step 1: for a point with a coordinate (x, y) in FIG. 3(a). computing a vertical distance and a horizontal distance from the point to a center of the square region, a larger one thereof being denoted as m, specifically:

$$m = \max\left(\text{abs}\left(\frac{1024-1}{2} - x\right), \text{abs}\left(\frac{1024-1}{2} - y\right)\right) \quad \text{(equation 1)}$$

Step 2: computing a distance from the point with a coordinate (x, y) to the $0^{th}$ point on a concentric square region (the position of the $0^{th}$ point may be arbitrarily selected; herein, the point in the upper left 45° direction is taken as the $0^{th}$ point), with a result being denoted as n, specifically:

$$n_{up} = y - m' \quad \text{(equation 2)}$$

$$n_{right} = s + x - m' \quad \text{(equation 3)}$$

$$n_{down} = 2 \times s + (1024 - 1 - y - i\ m') \quad \text{(equation 4)}$$

$$n_{left} = 3 \times s + (1024 - 1 - x - i\ m') \quad \text{(equation 5)}$$

Where $n_{up}$, $n_{right}$, $n_{down}$, $n_{left}$ denote the distances from the points at the upper side, right side, lower side, and left side of the concentric square to the 0th point, respectively; $g = 2 \times m$, ¼ of the number of pixels on the square:

$$m' = \left(\frac{1024-1}{2} - m\right);$$

Step 3: computing, based on the n and m. a longitude and a latitude corresponding to the point with the coordinate (x, y) on the square region, specifically:

$$\text{longitude} = \quad \text{(equation 6)}$$
$$\frac{n}{4s} \times 360° - 180° \text{ (where } n \text{ is } n_{up}, n_{right}, n_{down}, n_{left}\text{)}$$

$$\text{latitude} = \pm 90° - \frac{[m]}{N/2} \times \frac{H}{M/2} \times \pm 90° \quad \text{(equation 7)}$$

Step 4: computing, based on the longitude and latitude longitude, a position (X, Y) in the equirectangular panoramic image to which the point with the coordinate (x, y) on the square region is mapped, wherein:

$$X = \frac{180° + \text{longitude}}{360°} \times 2M \quad \text{(equation 8)}$$

$$Y = \left(\frac{90° - \text{latitude}}{180°}\right) \times M \quad \text{(equation 9)}$$

Step 5: if the (X, Y) is an integer pixel, assigning a pixel value at the equirectangular panoramic image (X. Y) to the point (x, y) on the square region: if the (X, Y) is not an integer pixel, taking a pixel value of the point (x, y) on the square region derived from interpolating a pixel near (X, Y). Preferably, the interpolating method adopted in this embodiment is a bicubic interpolation: other interpolating methods, such as bilinear interpolation and a nearest-neighbor interpolation, may also be adopted.

Figure 4:
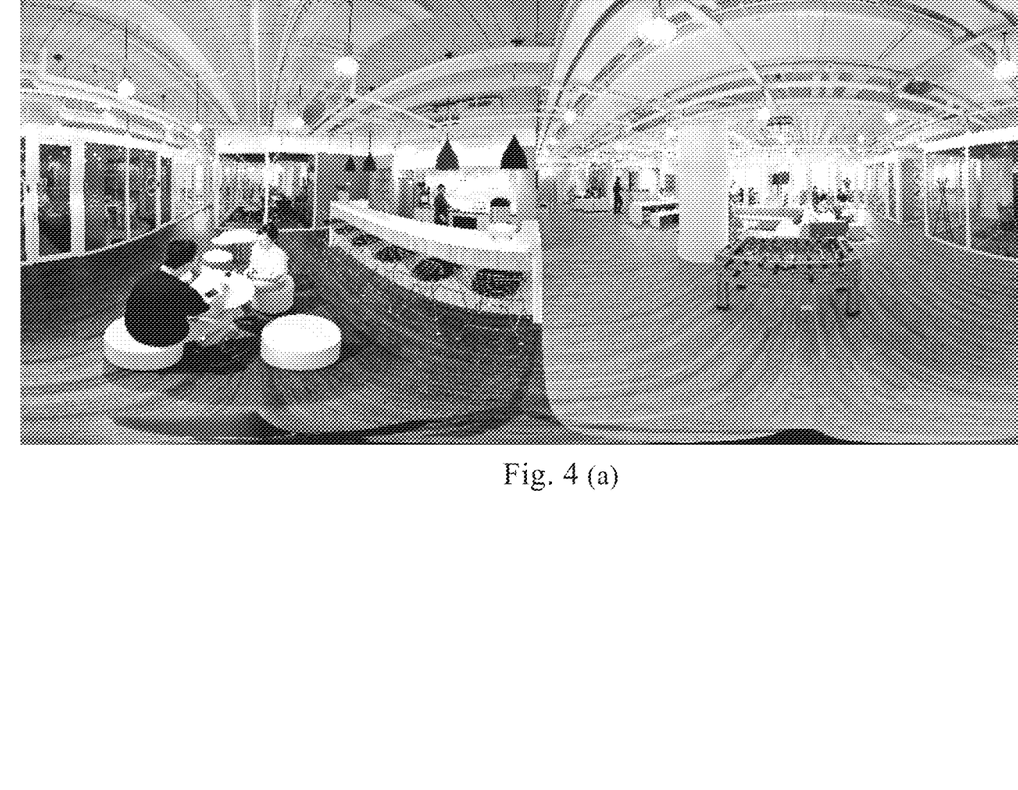
FIG. 4 is a mapping effect diagram according to the embodiments of the present disclosure.

Now, all steps of this mapping embodiment are completed. FIG. 4 shows the effect presented by this embodiment, where (a) denotes a panoramic image obtained using the equirectangular mapping method; and (b) denotes a panoramic image obtained from mapping according to the method provided by the present disclosure. It may be seen from the figure that in this mapping, the low-latitude region of the equirectangular panoramic image is reserved while the high-latitude regions are mapped to two square regions, which effectively reduces the area of the image (in other words, the number of pixels is reduced).

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. A panoramic image mapping method, wherein mapping regions and a non-mapping region are partitioned for an equirectangular panoramic image with a resolution of 2M ×M, where only the partitioned mapping regions are mapped to square regions to reduce oversampling, thereby achieving an object of effectively reducing the number of pixels of the panorama image and the code rate required for coding with little distortion; the method comprises:

Step 1: computing a vertical distance and a horizontal distance from a point with a coordinate (x, y) on a square region among the square regions to a central point of the square region, a larger one thereof being denoted as m;

Step 2: for the point with the coordinate (x, y) on the square region, computing a distance from the point to a zeroth ($0^{th}$) point on a concentric square region, denoted as n; the $0^{th}$ point being a point at an arbitrary position;

Step 3: computing, based on the n and m, a longitude and a latitude corresponding to the point with the coordinate (x, y) on the square region;

Step 4: computing, based on the longitude and latitude obtained in step 3, a position (X, Y) in the equirectangular panoramic image to which the point with the coordinate (x, y) on the square region is mapped; and Step 5: in the case that the (X, Y) is an integer pixel, assigning a pixel value at the equirectangular panoramic image (X, Y) to the point with the coordinate (x, y) on the square region; in the case that the (X, Y) is not an integer pixel, taking a pixel value of the point with the coordinate (x, y) on the square region derived from interpolating a pixel near (X, Y).

2. The panoramic image mapping method according to claim 1, wherein a high-latitude 2M×H region of the panoramic image is set as a mapping region, wherein the mapping regions are provided into two; the H is set as a height of the mapping region, H≤M/2.

3. The panoramic image mapping method according to claim 2, wherein a range of high-latitude of the panoramic image that is set as the mapping regions is from ±45° to ±90°.

4. The panoramic image mapping method according to claim 2, wherein H is 0.25 M.

5. The panoramic image mapping method according to claim 1, wherein in the step of computing a distance from the point to the $0^{th}$ point on the concentric square, a pixel at a right upper corner is specifically selected as the $0^{th}$ pixel, which is obtained through processes below:

$$n_{up} = y - m'$$ (equation 1)

$$n_{right} = s + x - m'$$ (equation 2)

$$n_{down} = 2 \times s + (1024 - 1 - y - m')$$ (equation 3)

$$n_{left} = 3 \times s + (1024 - 1 - x - m')$$ (equation 4)

where $n_{up}$, $n_{right}$, $n_{down}$, $n_{left}$ denote distances from points at an upper side, a right side, a lower side, and a left side of the concentric square region to the 0th point, respectively; s=2×m, ¼ of the number of pixels on the square;

$$m' = \left(\frac{1024-1}{2} - m\right);$$

and m denotes a larger one of the vertical distance and the horizontal distance from the point with the coordinate (x, y) on the square region to the center of the square region in step 1.

6. The panoramic image mapping method according to claim 1, wherein in step 3, the longitude and the latitude corresponding to the point with the coordinate (x, y) on the square region are calculated through equations below:

$$\text{longitude} = \frac{n}{4s} \times 360° - 180°$$ (equation 5)

$$\text{latitude} = \pm 90° - \frac{[m]}{N/2} \times \frac{H}{M/2} \times \pm 90°$$ (equation 6)

where 4s denotes the number of pixels of the concentric square region where the point is located; the value of ranges from −180° to 180°, denoting from longitude 180° W to longitude 180° E, the value of latitude ranges from $$\pm \frac{M}{M/2} \times 90° \text{ to } \pm 90°,$$

and where the positive value represents north latitude and the negative value represents south latitude.

7. The panoramic image mapping method according to claim 1, wherein in step 4, equation 7 and equation 8 are applied to calculate, based on the longitude and latitude, the position (X, Y) in the equirectangular panoramic image to which the point with the coordinate (x, y) on the square region is mapped:

$$X = \frac{180° + \text{longitude}}{360°} \times 2M$$ (equation 7)

$$Y = \left(\frac{90° - \text{latitude}}{180°}\right) \times M$$ (equation 8)

where the coordinate of the point on the square region is (x, y), a corresponding position in the equirectangular panoramic image to which this point is mapped is (X, Y), and a resolution of the equirectangular panoramic image is 2M×M.

8. The panoramic image mapping method according to claim 1, wherein the interpolating method in step 5 includes, but is not limited to, a bicubic interpolation, a bilinear interpolation, or a nearest-neighbor interpolation.

9. The panoramic image mapping method according to claim 1, wherein the interpolating method in step 5 is the bicubic interpolation.

\* \* \* \* \*